(12) United States Patent
Zhang et al.

(10) Patent No.: US 11,618,483 B2
(45) Date of Patent: Apr. 4, 2023

(54) MATRIX TRACK STRUCTURE AND SYSTEM, PRODUCTION LINE WITH ASSOCIATED LOOPS AND PRODUCTION METHOD USING THE PRODUCTION LINE

(71) Applicant: DOFSIM TECHNOLOGIES CO., LTD., Beijing (CN)

(72) Inventors: Defeng Zhang, Beijing (CN); Zuochun Zhang, Beijing (CN); Yongqiang Li, Beijing (CN); Baokui Li, Beijing (CN)

(73) Assignee: DOFSIM TECHNOLOGIES CO., LTD., Beijing (CN)

( * ) Notice: Subject to any disclaimer, the term of this patent is extended or adjusted under 35 U.S.C. 154(b) by 286 days.

(21) Appl. No.: 16/914,742

(22) Filed: Jun. 29, 2020

(65) Prior Publication Data

US 2020/0398870 A1    Dec. 24, 2020

Related U.S. Application Data

(63) Continuation of application No. PCT/CN2018/124435, filed on Dec. 27, 2018.

(30) Foreign Application Priority Data

Dec. 27, 2017    (CN) .......................... 201711453235.6

(51) Int. Cl.
| | | |
|---|---|---|
| *E01B 26/00* | (2006.01) | |
| *B25J 5/02*  | (2006.01) | |
| *B61B 13/00* | (2006.01) | |
| *B61B 1/00*  | (2006.01) | |
| *B65G 65/00* | (2006.01) | |

(52) U.S. Cl.
CPC ................ *B61B 13/00* (2013.01); *B61B 1/00* (2013.01); *E01B 26/00* (2013.01); *B65G 65/00* (2013.01)

(58) Field of Classification Search
CPC .. E01B 26/00; B61B 1/00; B61B 13/00; B25J 5/02
USPC .................................................. 700/214, 228
See application file for complete search history.

(56) References Cited

U.S. PATENT DOCUMENTS

| | | | | |
|---|---|---|---|---|
| 7,137,342 B2* | 11/2006 | Cho | .......................... | E01B 25/12 |
| | | | | 104/88.01 |
| 9,469,309 B2* | 10/2016 | Yagci | .......................... | B61C 3/00 |
| 9,684,006 B2* | 6/2017 | Pollack | .................. | G01N 35/04 |
| 9,738,450 B2* | 8/2017 | Lyon | .................... | B65G 1/1378 |
| 11,235,930 B2* | 2/2022 | Bastian, II | ........... | B25J 15/0616 |

(Continued)

FOREIGN PATENT DOCUMENTS

| | | |
|---|---|---|
| CN | 103693444 A | 4/2014 |
| CN | 103708193 A | 4/2014 |
| CN | 107042981 A | 8/2017 |

(Continued)

*Primary Examiner* — Douglas A Hess

(57) ABSTRACT

Disclosed are a matrix track system, a production line with associated loops and a production method using the production line. The matrix track system includes a plurality of track nodes which are arranged in a matrix and a plurality of fixed guide rails connecting the track nodes. The fixed guide rails include a plurality of longitudinal guide rails and a plurality of transverse guide rails. Each of the track nodes includes a turnout mechanism which includes a straight guide rail, an arc guide rail and a switch component for the switching of the straight guide rail and the arc guide rail.

10 Claims, 6 Drawing Sheets

(56) References Cited

U.S. PATENT DOCUMENTS

2006/0054049 A1    3/2006  Cho
2019/0277545 A1*  9/2019  Frone et al.

FOREIGN PATENT DOCUMENTS

| CN | 206798508 U | 12/2017 |
| CN | 108326824 A | 7/2018 |
| EP | 1013574 A1 | 6/2020 |

* cited by examiner

MATRIX TRACK STRUCTURE AND SYSTEM, PRODUCTION LINE WITH ASSOCIATED LOOPS AND PRODUCTION METHOD USING THE PRODUCTION LINE

CROSS-REFERENCE TO RELATED APPLICATION

This application claims the benefit of priority from Chinese Patent Application No. 201711453235.6, titled "A matrix track system, a production line with associated loops and a production method using the production line", filed on Dec. 27, 2017. The content of the aforementioned applications, including any intervening amendments thereto, is incorporated herein by reference.

TECHNICAL FIELD

This application relates to production lines, and more particularly to a matrix track system, a production line with associated loops and a production method using the production line.

BACKGROUND OF THE DISCLOSURE

Generally, processing or assembly devices are successively fixed at two sides of straight conveying lines to form production lines, in which workpieces to be processed or assembled travel on the conveying lines. For example, when the workpiece to be processed or assembled arrives at the location of processing or assembly devices, the conveying line stops, and the processing device processes the workpiece to be processed or assembled on the conveying line. Then, the workpiece continues to travel on the conveying line after the specific processing or assembly is finished, and the processing or assembly device is ready for the next workpiece to be processed or assembled.

However, in practical use, the existing production line has the following defects.

When there is a need to adjust the processing or assembly process, or change the products to be produced or assembled in the production line, actions of robots in the production line are required to be accordingly adjusted, and even the entire production line should be redesigned. Thus, the existing production line has poor generality and flexibility. As a result, the existing production line is only capable of processing or assembling specific workpieces, and cannot be adjusted as the processing or assembly process changes. Further, it is impossible to process or assemble different products in the same production line.

SUMMARY OF THE DISCLOSURE

The present disclosure aims to provide a matrix track system, a production line with associated loops based on the matrix system and a production method using the production line. The production line with associated loops is based on the matrix track system, which has good generality and flexibility, so that the configuration of the production line with associated loops can be changed at any time according to the requirements, and thus the production line is not affected by failures. Besides, the processing or assembly of the workpiece is finished after passing the production line, and multiple operations are carried out at the same time, so a high work efficiency is achieved using the production line.

To achieve the above purposes, the present disclosure provides a matrix track system, comprising a plurality of track nodes which are arranged in a matrix, a plurality of fixed guide rails connecting the track nodes and a plurality of turnout mechanisms mounted on the track nodes;

wherein the fixed guide rails comprise a plurality of transverse guide rails and a plurality of longitudinal guide rails; each of the turnout mechanisms comprises a straight guide rail, an arc guide rail and a switch component; adjacent fixed guide rails which are in a line are connected through the straight guide rail; when adjacent fixed guide rails are perpendicular to each other, the straight guide rail is turned into the arc guide line through the switch component, so that a loop is formed.

The present disclosure further provides a production line with associated loops, comprising the matrix track system, wherein the matrix track system comprises at least two loops; one of the at least two loops is associated with at least one loop of the other of the at least two loops, and two loops which are associated have an associated path, wherein the associated path is formed by the track nodes and the guide rails that the two loops share.

The present disclosure further provides a production method using the production line, comprising:
1) placing objects on the conveyor devices;
2) processing the objects carried by conveyor devices traveling on a first-level loop and a next-level loop which are associated to obtain a first-level semi-finished product until the objects carried by conveyor devices travelling on a (N−1)-level loop and an N-level loop which are associated are processed to obtain a (N−1)-level semi-finished product;
3) outputting, in the N-level loop, the (N−1)-level semi-finished product obtained in the (N−1)-level loop as a finished product;

wherein N is a positive integer greater than 1; the loops comprise 1 to N level loops.

The present invention has the following advantages.

The straight guide rail and the arc guide rail can be switched through the switch component, and a plurality of production lines (loops) can be formed in the matrix track system, so that different productions can be processed or assembled through the production lines, thereby improving the generality and flexibility of the matrix track system.

DETAILED DESCRIPTION OF EMBODIMENTS

Figure 1:
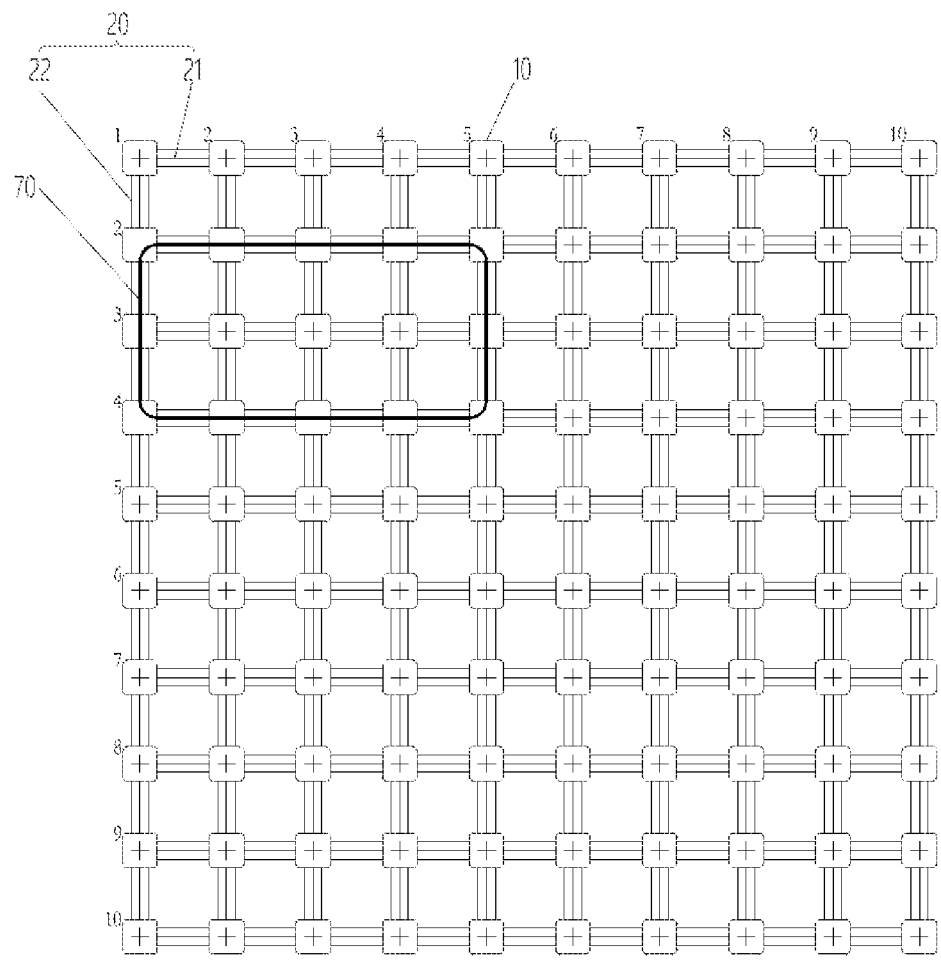
FIG. 1 is a schematic diagram of a matrix track system according to an embodiment of the present disclosure.
Figure 2:
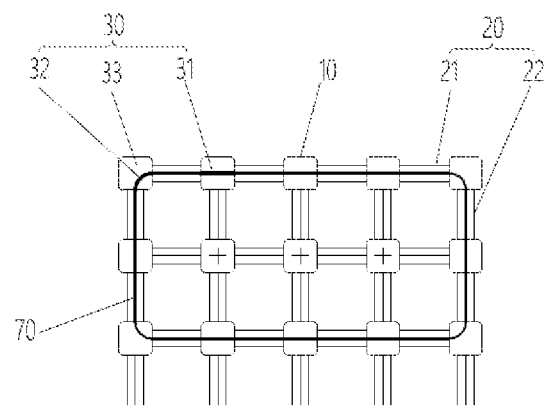
FIG. 2 schematically shows a loop of the matrix track system according to an embodiment of the present disclosure.
Figure 3:
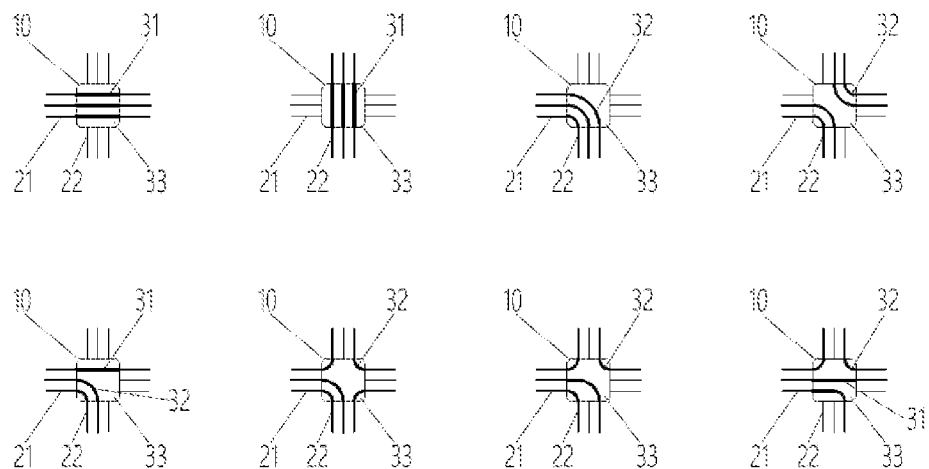
FIG. 3 schematically shows the switching forms of a switch component of the matrix track system according to an embodiment of the present disclosure.

Referring to FIGS. 1-3, the present disclosure provides a matrix track system, including a plurality of track nodes 10 which are arranged in a matrix, a plurality of fixed guide rails connected the track nodes 10 and a plurality of turnout mechanisms 30 mounted on the track nodes 10. The fixed guide rails 20 include a plurality of transverse guide rails 21 and a plurality of longitudinal guide rails 22. Each of the turnout mechanisms 30 includes a straight guide rail 31, an arc guide rail 32 and a switch component 33. Adjacent fixed guide rails which are in a line are connected through the straight guide rail 31. When adjacent fixed guide rails are perpendicular to each other, the straight guide rail 31 is turned into the arc guide rail 32 through the switch component 33, so that a loop 70 is formed.

The straight guide rail 31 and the arc guide rail 32 can be switched through the switch component 33, and a plurality of production lines (loops) can be formed in the matrix track system, so that different productions can be processed or assembled through the production lines, thereby improving the generality and flexibility of the matrix track system.

FIG. 2 shows the transverse guide rail 21, the longitudinal guide rail 22, the straight guide rail 31 and the arc guide rail 32.

In some embodiment, a plurality of transverse guide rails 21 in parallel are arranged between adjacent track nodes 10 in a transverse direction, or a plurality of longitudinal guide rails 22 in parallel are arranged between adjacent track nodes 10 in a longitudinal direction. Specifically, as shown in FIG. 1, three longitudinal guide rails 22 in parallel are arranged between adjacent track nodes 10 in the first column. Three longitudinal guide rails 22 in parallel are arranged between adjacent track nodes 10 in the second column. Three longitudinal guide rails 22 in parallel are arranged between adjacent track nodes 10 in the third column. Three transverse guide rails 21 in parallel are arranged between adjacent track nodes 10 in the first row. Three transverse guide rails 21 in parallel are arranged between adjacent track nodes 10 in the second row. Three transverse guide rails 21 in parallel are arranged between adjacent track nodes 10 in the third row.

In this embodiment, the switch component 33 includes a storage element, a pick-and-place element, and an extension element. As shown in FIG. 3, the storage element is configured to store the straight guide rail 31 and/or the arc guide rail 32 of different sizes. The pick-and-place element is configured to pick and place the straight guide rail 31 and/or the arc guide rail 32. The extension element is configured to drive the straight guide rail 31 and/or the arc guide rail 32 to a preset position, so that the straight guide rail 31 and/or the arc guide rail 32 connects the transverse guide rails 21, the longitudinal guide rails 22, and/or the transverse guide rail 21 and the longitudinal guide rail 22. As shown in FIG. 2, when the track nodes 10 in the first row need to be connected through the straight guide rails 31, the pick-and-place element places the straight guide rails 31 on the extension element, and the extension element drives the two straight guide rails 31 to a preset position, so that the two straight guide rails 31 communicate with two transverse guide rails 21. When the track node 10 at the intersection of the first row and the fifth column needs to connect the transverse guide rails or the longitudinal guide rails, the extension element drives the two straight guide rails 31 to a preset position, and the pick-and-place element picks the two straight guide rails 31 on the extension element into the storage element, and places two arc guide rails 32 located in the storage element on the extension element. The extension element drives the two arc guide rails 32 to a preset position, so that the two arc guide rails 32 are connected with the two transverse guide rails 21 which are parallel with each other and the two longitudinal guide rails 22 which are parallel to each other.

The track nodes 10 arranged at sides of the matrix is connected with an external production line; and the transverse guide rails 21 and/or the longitudinal guide rails 22 are connected with the external production line through the straight guide rail 31.

Referring to FIGS. 4-10, the matrix track system further comprises conveyor devices 40 which are configured to convey objects, and are mounted and circulate on the loop 70. The objects comprise a workpiece to be processed or assembled, a tool, a function execution device 50 or a DOF motion device 60. There are a plurality of conveyor devices 40 on the loop 70.

In this embodiment, the function execution device 50 is arranged on the conveyor device 40 or is arranged near the loop 70.

In practical applications, when the conveyor device 40 arrives at a track node 10 where a turn is needed, the straight guide rail 31 is turned into the arc guide rail 32 through the switch component 33, so that the longitudinal guide rail 21 and the transverse guide rail 22 are connected via the arc guide rail 32, which allows the convey device 40 travelling on the transverse guide rail 21 to turn to travel on the longitudinal guide rail 22, or allows the convey device 40 travelling on the longitudinal guide rail 22 to turn to travel on the transverse guide rail 21. When the convey device 40 travels to go straight at the track node 10, the arc guide rail 32 is turned into the straight guide rail 31, so that the straight guide rail 31 connects transverse guide rails 21 or longitudinal guide rails 22, which allows the convey device 40 to go straight along the transverse guide rails 21 or longitudinal guide rails 22.

In this embodiment, during the switching between the straight guide rail 31 and the arc guide rail 32, the conveyor devices 40 are not located on the straight guide rail 31 or the arc guide rail 32.

In this embodiment, the straight guide rails 31 and the arc guide rails 32 are not required to be adjusted after the loop 70 is arranged. However, the loop 70 should be rearranged through the turnout mechanisms 30 when a track node 10 or a section of a loop fails, or a product or an assembling process needs to be changed, or at least one conveyor device 40 is required to be removed from the loop. At this time, the switching between the straight guide rails 22 and the arc guide rails 23 is realized to adjust the loop 70.

In this embodiment, when one or more track node or one or more section of the loop 70 fails, the production line with associated loops can be rearranged in accordance with the processing or assembly requirements of the workpieces, in which the workpieces are processed or assembled without stopping the production line. Thus, the processing or assembly of the workpieces is not affected, so that the production efficiency is greatly improved.

Figure 5:
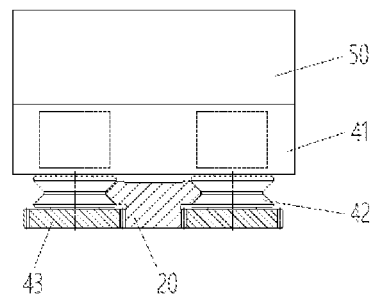
FIG. 5 schematically shows a guide rail and a function execution device of the matrix track system according to an embodiment of the present disclosure.
Figure 8:
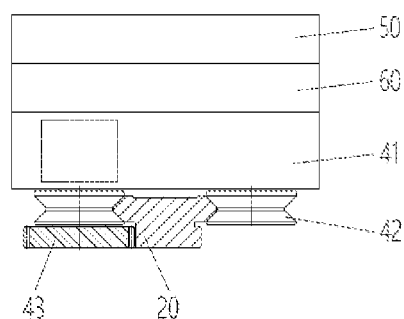
FIG. 8 schematically shows the guide rail and the function execution device of the matrix track system according to another embodiment of the present disclosure.

Referring to FIGS. 5 and 8, the conveyor device 40 includes a carrying platform 41, a guide mechanism 42 and a drive mechanism 43. The carrying platform 41 is configured to carry the objects. The guide mechanism 42 is configured to fit with guide rails of the loop and guide the carrying platform 41 to move along the guide rails of the loop, where, the guide rails of the loop are formed by the transverse guide rails 21, the longitudinal guide rails 22, the straight guide rails 31 and the arc guide rails 32. The drive mechanism 43 is configured to drive the carrying platform 41 to move.

Referring to FIG. 5, the guide rail is provided with teeth at both sides. The guide mechanism 42 is a guide roller, and the guide rollers are fitted to both sides of the guide rail 20 to play a guiding role. The teeth are provided at two sides of the guide rail of the loop and are engaged with gears on both sides of the drive mechanism 43, so that the carrying platform 41 stably runs on the guide rail. The carrying platform 41 shown in FIG. 5 only carries the function execution device 50.

Referring to FIG. 8, the guide rail is provided with teeth at one side. The guide mechanism 42 is a guide roller, and the guide rollers are fitted to both sides of the guide rail to play a guiding role. The teeth are provided at one side of the guide rail and are engaged with a gear on one side of the drive mechanism 43, so that the carrying platform 41 stably runs on the guide rail. The carrying platform 41 shown in FIG. 8 is provided with a DOF motion device 60, and the function execution device 50 is placed on the DOF motion device 60.

The difference between the guide rail in FIG. 5 and the guide rail in FIG. 8 is that the guide rail is provided with teeth at one side or two sides. When the guide rail has teeth at both sides, the conveyor device 40 is capable of turning towards more directions, thus rendering more planning paths of the loop 70.

Figure 11:
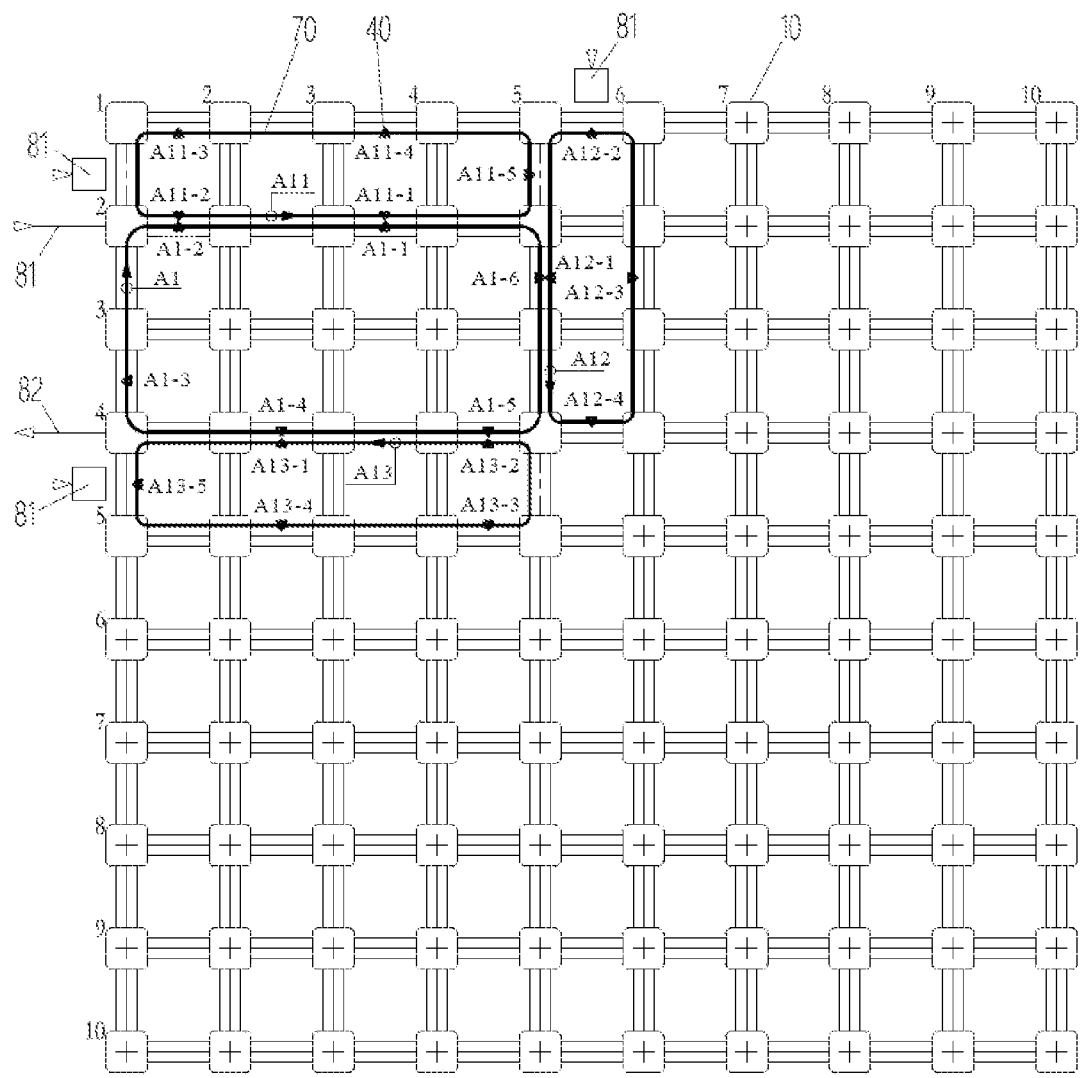
FIG. 11 schematically shows a production line with associated loops according to an embodiment of the present disclosure.

Referring to FIG. 11, the track system further includes a loading station 81 and/or an unloading station 82 which is arranged beside the guide rail of the loop. The loading station 81 is provided with a loading robot, and the unloading station 82 is provided with an unloading robot. The loading robot and the unloading robot are configured to grab materials.

Figure 6:
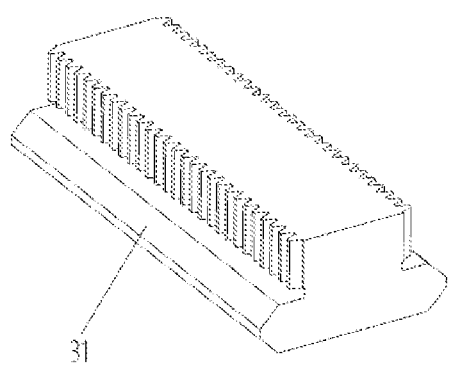
FIG. 6 is a schematic diagram of a straight guide rail having teeth at two sides in the matrix track system according to an embodiment of the present disclosure.
Figure 7:
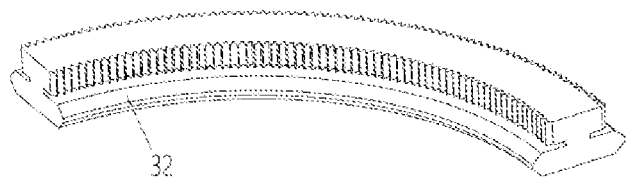
FIG. 7 is a schematic diagram of an arc guide rail having teeth at two sides in the matrix track system according to an embodiment of the present disclosure.
Figure 9:
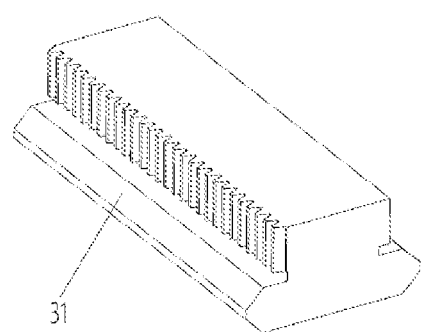
FIG. 9 is a schematic diagram of a straight guide rail having teeth at one side in the matrix track system according to an embodiment of the present disclosure.
Figure 10:
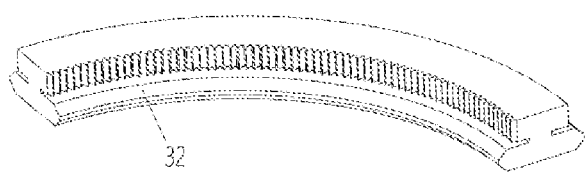
FIG. 10 is a schematic diagram of an arc guide rail having teeth at one side in the matrix track system according to an embodiment of the present disclosure.

In this embodiment, the guide rails of the loop are not limited to the guide rail with teeth at two sides shown in FIGS. 5-7 and the guide rail with teeth at one side shown in FIGS. 8-10. The conveyor device 40 is a smart car with power which is self-driven. The conveyor device 40 is controlled to move on the guide rail through electricity, magnetic forces, signals sent by wireless transmission devices for driving the conveyor device to move in a certain trajectory or other forms. The workpieces may be parts or components. The tool may be a processing tool, an assembly tool, an inspection tool, a measuring tool, or a polishing tool. The function execution device 50 may be a processing device, an assembly device, an inspection device, a measuring device, a polishing device, or the like. The DOF motion device 60 may be a drive device capable of moving in multiple directions, such as a common 6-DOF manipulator, a Delta parallel manipulator, or a Scara robot. Obviously, the conveyor device 40, the workpiece, the tool, and the function execution device 50 may be in other forms, which are not limited herein.

Referring to FIG. 11, provided is a track system with 100 track nodes 10 with 10 rows and 10 columns. The number on the top row of the track system represents the column number, and the number on the left represents the row number. The track node 10 is represented by Pi, j, where i represents the row where the track node 10 is located, and j represents the column where the track node 10 is located. For example, P2,3 represents the track node 10 in the second row and the third column.

Figure 4:
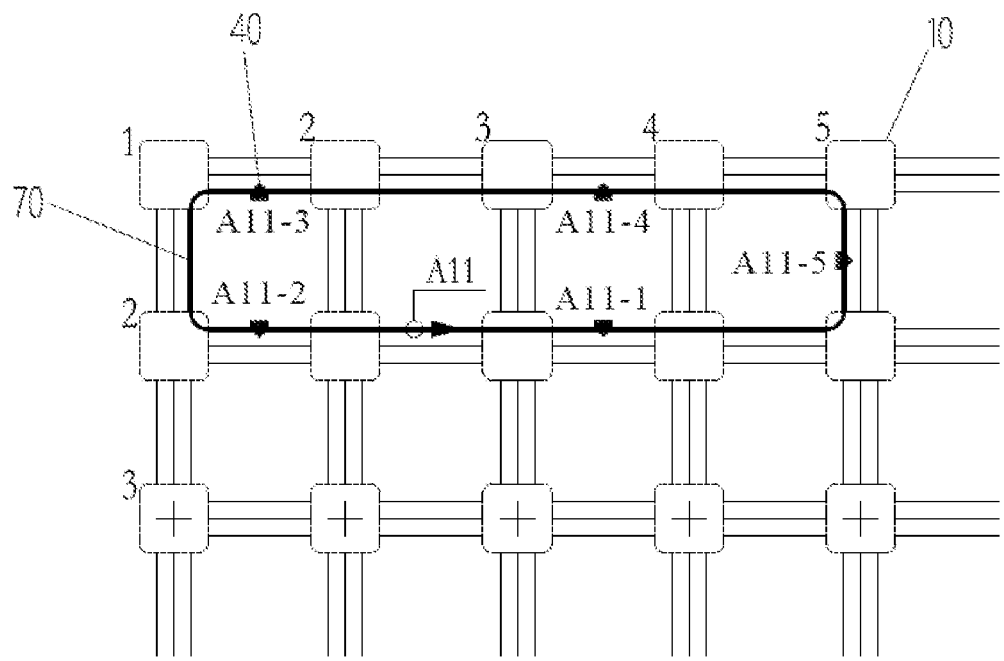
FIG. 4 is a schematic diagram of a loop in the matrix track system according to an embodiment of the present disclosure.

The conveyor devices 40 provided on the loop 70 and the traveling direction (shown by arrows) of the conveyor devices 40 on the loop 70 are shown in FIG. 4. Each conveyor device 40 is marked with a corresponding reference number, such as A11-1 to A11-5 in FIG. 4. The loop 70 is indicated by a thick solid line, and is marked with a corresponding reference number, for example, A11 marked in FIG. 4. At least one conveyor device 40 circulates on the loop 70. In FIG. 4, the loop 70 is a loop formed by track nodes P1,1, P1,2, P1,3, P1,4, P1,5, P2,5, P2,4, P2,3, P2,2 and P2,1 and the straight guide rails 31 and the arc guide rails therebetween.

In the track system shown in FIG. 11, the turnout mechanism on the track node P2,5 provides a straight guide rail 31 for the loop A12 and an arc guide rail 32 for loops A11 and A1. The types of the guide rails on the turnout mechanisms determine the shape of the loop 70.

Referring to FIG. 11, the present disclosure further provides a production line with associated loops, including the matrix track system. The matrix track system includes at least two loops 70, and one of the at least two loops 70 is associated with at least one loop 70 of the other of the at least two loops 70, and two loops which are associated have an associated path, wherein the associated path is formed by the track nodes and the guide rails that the two loops share.

In this embodiment, the production line is capable of carrying out multiple operations at the same time, for example, one workpiece 1 is mounted on the part while another workpiece 2 is tested. The production line with associated loops replaces fixed operation mode of the traditional production line, in which multiple operation are simultaneously carried out, which greatly improves the production efficiency, thus greatly shortening the production cycle.

In this embodiment, the length of the associated path is designed according to the time required for the operation. Each loop 70 is provided with the loading station 81 and/or unloading station 82. For two loops 70 with an associated path, the conveyor devices 40 on the two loops 70 travel on the associated path in the same direction at the same speed. The conveyor devices 40 on the two loops 70 travel side by side or have a distance along a length of the two loops, so that the objects are processed on the two conveyor devices 40 which travel on the associated path and belong to the associated loops 70.

In addition, when the conveyor devices 40 on the two loops 70 travel on the associated path at the same time, the two conveyor devices 40 may not be connected. Preferably, the two conveyor devices 40 are connected to each other. This can improve the safety of the operation. However, it should be noted that the two conveyor devices should be detached from each other in time as they are to be separated.

In this embodiment, the two loops 70 having the associated path are associated in a nested form or a parallel form.

The nested associated loops mean that one loop 70 is located inside the other loop 70, and the nested associated loops share track nodes 10 and guide rails. The parallel associated loops mean that one loop 70 is located outside the other loop 70, and the parallel associated loops share track nodes 10 and guide rails.

In this embodiment, through the nested associated loops and/or parallel associated loops, the workpieces are processed or assembled step by step, including the combination of the tool and the workpiece, the combination of the tool and the function execution device, the combination of the function execution device and the DOF motion device, and the processing or assembly of workpieces using the function execution device, etc. The processing or assembly which involves the function execution device and the DOF motion device is equivalent to the processing or assembly carried out by assembly robots in the temporary assembly.

Referring to FIG. 11, loops A11 and A1 are parallel associated loops, and the section from the track node P2,1 and the track node P2,5 is the associated path, where in the associated path, the conveyor devices 40 on the loop A11 and the loop A1 travel in the same direction at the same speed. As shown in FIG. 11, when the conveyor device A11-2 on the loop A11 and the conveyor device A1-2 on the loop A1 move on the associated path, the conveyor device A11-2 on the loop A11 and the conveyor device A1-2 on the loop A1 move side by side, and the conveyor device A11-1 on the loop A11 and the conveyor device A1-1 on the loop A1 move side by side. At this time, the function execution device 50 on the conveyor device A11-2 performs a functional operation on the workpiece on the conveyor device A1-2, and the function execution device 50 on the DOF motion device 60 on the conveyor device A11-1 performs a functional operation on the workpiece on conveyor device A1-1.

Figure 12:
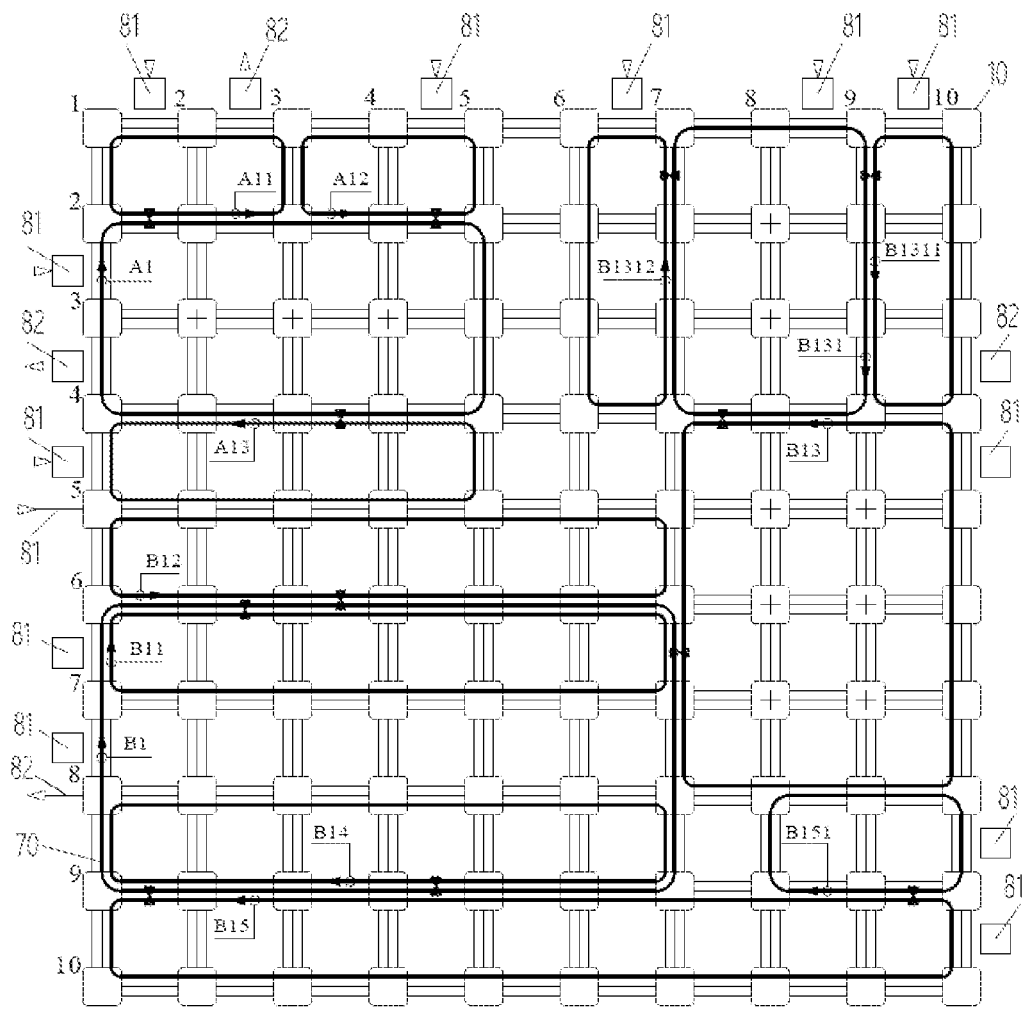
FIG. 12 schematically shows a production line with associated loops according to another embodiment of the present disclosure.

Referring to FIG. 12, loops B11 and B1 are nested associated loops, and the section from the track node P6,1 and the track node P6,7 is the associated path, where in the associated path, the conveyor devices 40 on the loop A11 and the loop A1 travel in the same direction at the same speed. For example, the function execution devices 50 on the conveyor device 40 on the two loops perform a certain function operation in the associated path.

In the practical product, a charging section is provided in the loop 70, or the loop 70 is connected to an external charging section which is provided with charging piles.

In the practical use, in the case that the loop 70 is provided with the charging section, the conveyor device 40, the function execution device 50, the DOF motion device 60, etc. are charged without stops while passing through the charging section through wireless charging. In the case that an external charging section is provided, the conveyor device 40 may carry the function execution device 50 and the DOF motion device 60 to the charging section, and the conveyor device stops for the wired or wireless charging through a charging pile.

Based on the production line, the present disclosure further provides a production method, which includes the following steps.

1) Objects are placed on the conveyor devices 40.

2) The objects are processed by conveyor devices 40 traveling on a first-level loop and a next-level loop which are associated to obtain a first-level semi-finished product until the objects carried by conveyor devices 40 travelling on a (N−1)-level loop and an N-level loop which are associated are processed to obtain a (N−1)-level semi-finished product.

3) In the N-level loop, the (N−1)-level semi-finished product obtained in the (N−1)-level loop is output as a finished product;

Where, N is a positive integer greater than 1; the loops include 1 to N level loops.

The object is a workpiece, a tool, a function execution device 50 or a DOF motion device 60.

Further, the workpiece may be a part or a component, and the tool may be a processing tool, an assembly tool, an inspection tool, a measuring tool, or a polishing tool, etc. The function execution device 50 may be a processing device, an assembly device, an inspection device, a measuring device, a polishing device, or the like. The DOF motion device 60 may be a drive device capable of moving in multiple directions.

The production method of this embodiment is applicable for production lines such as assembly production lines and processing production lines.

Specifically, the operation objects are placed on the conveyor devices 40 which circularly travel on corresponding loops 70 through the loading stations 81. The objects carried by the conveyor device 40 traveling on a second-level loop and the objects carried by the conveyor devices 40 traveling on a first-level loop are processed in the associated path to obtain a first-level semi-finished product; or the objects carried by the conveyor devices 40 traveling on the second-level loop are the first-level semi-finished products directly loaded through the loading station 81. The objects carried by the conveyor devices 40 traveling on a third-level loop and the first-level semi-finished products carried by the conveyor devices 40 traveling on the second-level loop are processed in the associated path to obtain a second-level semi-finished product; or the objects carried by the conveyor devices 40 traveling on the third-level loop are the second-level semi-finished products directly loaded through the loading station 81. This process is repeated until the finished products (i.e., the (N−1)-level semi-finished products) are output, and at this time, the production is finished.

The following describes the working process and principle of this embodiment by taking the production line shown in FIG. 12 as an example.

FIG. 12 shows a track system with 100 track nodes 10 having 10 rows and 10 columns. Product A and product B are simultaneously assembled online in the track system. The product A is assembled from a first part, a second part, a third part and a fourth part, where the first part is the basic part for the assembly. Referring to FIG. 12, Loops A1, A11, A12 and A13 are designed for the product A, where A1 is a second-level loop, and A11, A12 and A13 are first-level loops. The loops A1 and A11 have an associated path which is from the track node P2,1 to the track node P2,3. The loops A1 and A12 have an associated path which is from the track node P2,3 to the track node P2,5. The loops A1 and A13 have an associated path which is from the track node P4,1 to the track node P4,5.

The product A is assembled as follows.

The first part is placed on the conveyor device 40 traveling on the loop A1 from the loading station 81 by a loading robot. The second part, the third part and the fourth part are placed on the conveyor devices 40 traveling on respective loops from respective loading stations 81. The second part is mounted on the first part in the associated path of the loops A1 and A11. The third part is mounted on the first part in the associated path of the loops A1 and A12. The fourth part is mounted on the first part in the associated path of the loops A1 and A13. When the second, third and fourth parts all are mounted on the first part, the assembly of the product A is finished, and the finished product is output through the unloading station 82 of the loop A1.

The product B is assembled from a basic tooling, a first part, a second part, a third part, a fourth part, a first component and a second component. As shown in FIG. 12, loops B1, B11, B13, B14, B15, B131, B1311, B1312 and B151 are designed for the product B, where B is a fourth-level loop; B11, B12, B13, B14 and B15 are third-level loops; B131 and B151 are second-level loops; and B1311 and B1312 are first-level loops. B1311 and B131 have an associated path which is from the track node P1,9 to the track node P4,9; B1312 and B131 have an associated path which is from the track node P1,7 to the track node P4,7; B131 and B13 have an associated path which is from the track node P4,7 to the track node P4,9; B151 and B15 have an associated path which is from the track node P9,8 to the track node P9,10; B11 and B1 have an associated path which is from the track node P6,1 to the track node P6,7; B12 and B1 have an associated path which is from the track node P6,1 to the track node P6,7; B13 and B1 have an associated path which is from the track node P6,7 to the track node P8,7; B14 and B1 have an associated path which is from the track node P9,1 to the track node P9,7; and B15 and B1 have an associated path which is from the track node P9,1 to the track node P9,7. The product B is assembled step by step through these loops.

The product B is assembled as follows.

The tool is placed on the conveyor device 40 traveling on the loop B1311 from the loading station 81 of the loop B1311, and in the associated path of B1311 and B131, the tool is transmitted to the conveyor device 40 traveling on B131.

The first part is placed on the conveyor device 40 traveling on the loop 1312 through the loading station 81 of the loop B1312, and in the associated path of B1312 and B131, the first part is clamped by the tool.

The third part is placed on the conveyor device 40 traveling on the loop B13 through the loading station 81 of the loop B13, and in the associated path of B131 and B13, the first component is mounted on the third part to obtain a first semi-finished product.

The second component is placed on the conveyor device 40 traveling on the loop B151 through the loading station 81 of the loop B151, and the fourth part is placed on the conveyor device 40 traveling on the loop B15 through the loading station 81 of the loop B15. In the associated path of B151 and B15, the second component is mounted on the fourth part to obtain a second semi-finished product.

The first part is placed on the conveyor device 40 traveling on the loop B11 from the loading station 81 of the loop B11; the second part is placed on the conveyor device 40 traveling on the loop B12 from the loading station 81 of the loop B12. The basic tooling is placed on the conveyor device 40 traveling on the loop B1 from the loading station 81 of the loop B1. The test device is located on the conveyor device 40 of the loop B14 and circulates along B14.

In the associated path of B11 and B1 the first part is mounted on the basic tooling; in the associated path of B12 and B1, the second part is mounted on the basic tooling; in the associated path of B13 and B1, the first semi-finished product is mounted on the basic tooling; and in the associated path of B15 and B1, the second semi-finished product is mounted on the basic tooling to finish the assembly of the product B.

Finally, in the associated path of the loop B14 and the loop B1 (from the track node P9,1 to the track node P9,7), the test device tests the assembled product B (including the basic tooling, the first part, the second part, the first semi-finished product and the second semi-finished product) traveling on the loop B1. Then, the tested product is output from the unloading station 82 of the loop B1.

In this embodiment, if a road section fails and the associated loop needs to be adjusted, the configuration of the loop and the position of associated path are adjusted through the switch mechanism of the turnout mechanism. Therefore, the same product may be assembled through different configurations of the associated loop type production line, which is flexible in design. The production line greatly improves the production efficiency and allows the track system to have good flexibility.

This embodiment has the following advantages.

The production line of this embodiment is based on the matrix track system, which has good generality and flexibility, so that the configuration of the production line can be changed at any time according to the requirements, and thus the production line is not affected by failures. Besides, the processing or assembly of the workpiece is finished after passing the production line, and multiple operations are carried out at the same time, so a high work efficiency is achieved using the production line with associated loops.

The above are the preferred embodiments of the present disclosure. Any equivalent change and modification made by those skilled in the art without departing from the spirit and scope of the present disclosure shall fall within the scope of the present disclosure.

What is claimed is:

1. A matrix track system, comprising a plurality of track nodes which are arranged in a matrix, a plurality of fixed guide rails connecting the track nodes and a plurality of turnout mechanisms mounted on the track nodes;
   wherein the fixed guide rails comprise a plurality of transverse guide rails and a plurality of longitudinal guide rails; each of the turnout mechanisms comprises a straight guide rail, an arc guide rail and a switch component; adjacent fixed guide rails which are in a line are connected through the straight guide rail; when adjacent fixed guide rails are perpendicular to each other, the straight guide rail is turned into the arc guide rail through the switch component, so that a loop is formed.

2. The matrix track system of claim 1, wherein a plurality of transverse guide rails parallel to each other are provided between two adjacent track nodes in a transverse direction; and a plurality of longitudinal guide rails parallel to each other are provided between two adjacent track nodes in a longitudinal direction.

3. The matrix track system of claim 1, wherein the track nodes arranged at sides of the matrix is connected with an external production line; and the transverse guide rails and/or the longitudinal guide rails are connected with the external production line through the straight guide rail.

4. The matrix track system of claim 1, further comprising conveyor devices, wherein
   the conveyor devices are configured to convey objects, and are mounted and circulate on the loop.

5. The matrix track system of claim 4, wherein
   each of the conveyor devices comprises a carrying platform, a guide mechanism and a drive mechanism; the carrying platform is configured to carry the objects; the guide mechanism is configured to fit with guide rails of the loop and guide the carrying platform to move along the guide rails of the loop, wherein the guide rails of the loop are formed by the transverse guide rails, the longitudinal guide rails, straight guide rails and the arc guide rails; and the drive mechanism is configured to drive the carrying platform to move.

6. A production line with associated loops, comprising the matrix track system of of claim 5, wherein the matrix track system comprises at least two loops; one of the at least two loops is associated with at least one loop of the other of the at least two loops, and two loops which are associated have an associated path, wherein the associated path is formed by the track nodes and the guide rails that the two loops share.

7. The production line of claim 6, wherein the conveyor devices on two loops which are associated travel on the associated path of the two loops in the same direction at the same speed; the conveyor devices on the two loops travel side by side or have a distance along a length of the two loops, so that an operation is carried out for objects on the conveyor devices on the associated path.

8. The production line of claim 6, wherein the two loops with the associated path are in a nested form or a parallel form.

9. A production method using the production line of claim 6, comprising:

1) placing objects on the conveyor devices;

2) processing the objects carried by conveyor devices traveling on a first-level loop and a next-level loop which are associated to obtain a first-level semi-finished product until the objects carried by conveyor devices travelling on a (N−1)-level loop and an N-level loop which are associated are processed to obtain a (N−1)-level semi-finished product;

3) outputting, in the N-level loop, the (N−1)-level semi-finished product obtained in the (N−1)-level loop as a finished product;

wherein N is a positive integer greater than 1; the loops comprise 1 to N level loops.

10. The matrix track system of claim 1, further comprising a loading station and/or an unloading station which are arranged near the loop.

\* \* \* \* \*

UNITED STATES PATENT AND TRADEMARK OFFICE
CERTIFICATE OF CORRECTION

| | | |
|---|---|---|
| PATENT NO. | : 11,618,483 B2 | Page 1 of 1 |
| APPLICATION NO. | : 16/914742 | |
| DATED | : April 4, 2023 | |
| INVENTOR(S) | : Defeng Zhang et al. | |

It is certified that error appears in the above-identified patent and that said Letters Patent is hereby corrected as shown below:

On the Title Page

Item (54) and in the Specification Column 1, Lines 1-4, The correct title should be: MATRIX TRACK SYSTEM, PRODUCTION LINE WITH ASSOCIATED LOOPS AND PRODUCTION METHOD USING THE PRODUCTION LINE Signed and Sealed this
Fourth Day of February, 2025

Coke Morgan Stewart
*Acting Director of the United States Patent and Trademark Office*